United States Patent [19]

Kitson et al.

[11] 3,824,784

[45] July 23, 1974

[54] THRUST DEFLECTORS FOR DUCTED FAN GAS TURBINE ENGINES

[75] Inventors: George Samuel Kitson; Julian MacDonald Davison Sutton, both of Nottingham, England

[73] Assignee: The Secretary of State for Defence, London, England

[22] Filed: June 30, 1972

[21] Appl. No.: 267,972

Related U.S. Application Data

[63] Continuation of Ser. No. 75,621, Sept. 25, 1970, abandoned.

[30] Foreign Application Priority Data

Sept. 29, 1969 Great Britain .................... 47742/69

[52] U.S. Cl. .................... 60/226 A, 60/229, 60/230, 239/265.31
[51] Int. Cl. .......................... F02c 3/06, F02k 3/06
[58] Field of Search .................. 60/226 A, 230, 229; 239/265.19, 265.31

[56] References Cited
UNITED STATES PATENTS

| | | | |
|---|---|---|---|
| 2,955,418 | 10/1960 | David et al. | 239/265.31 X |
| 3,024,601 | 3/1962 | Nash | 60/226 A |
| 3,492,821 | 2/1970 | Monaghan et al. | 60/226 A |
| 3,503,211 | 3/1970 | Medawar et al. | 60/226 A |

FOREIGN PATENTS OR APPLICATIONS 739,500  11/1955  Great Britain ................ 239/265.31

Primary Examiner—Carlton R. Croyle
Assistant Examiner—Robert E. Garrett
Attorney, Agent, or Firm—Cushman, Darby & Cushman

[57] ABSTRACT

A ducted fan gas turbine engine has thrust reverser doors mounted at the hot gas stream exhaust nozzle and a fan cowl downstream portion which is translatable. The thrust reverser doors deflect the hot gas stream radially outwards and the hot gas stream in turn, deflects the cold fan stream radially outwards through a gap found by translation of the fan cowl downstream portion in a downstream direction.

2 Claims, 2 Drawing Figures

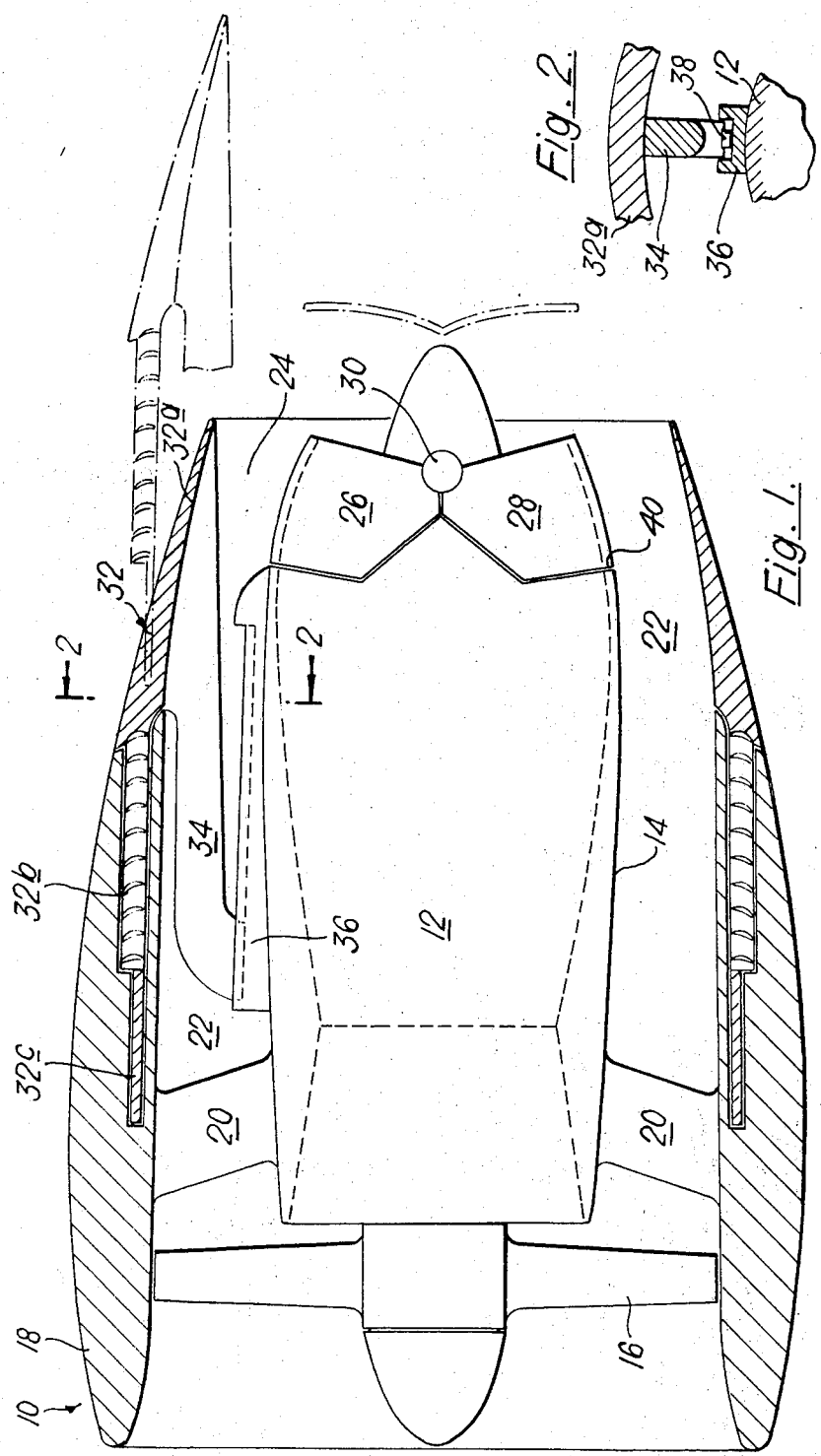

THRUST DEFLECTORS FOR DUCTED FAN GAS TURBINE ENGINES

This is a continuation, of application Ser. No. 75,621 filed Sept. 25, 1970, now abandoned.

This invention concerns thrust deflectors for ducted fan gas turbine engines.

According to the present invention there is provided a ducted fan gas turbine jet propulsion engine comprising a gas turbine jet propulsion engine enclosed by a casing and mounted within a cowl in radially spaced apart relationship therewith, the gas turbine jet propulsion engine having at least one stage of fan blades mounted for rotation about the engine axis, the blades extending radially outwards into a duct formed between the gas turbine jet propulsion engine and the cowl, the downstream end of the cowl being separate from the upstream portion thereof and axially moveable relative thereto and having a cascade member attached to its upstream end so as to be moveable therewith, the downstream end of the engine casing including thrust reverser doors pivotable to and from a position whereby they obstruct the flow of gases from the engine and causes them to deflect radially outwards of the engine axis.

Preferably the downstream end of the cowl moves the cascade members so as to align them with the flow path of the deflected gases from the gas turbine jet propulsion engine.

Preferably the cascade members are so shaped that the engine exhaust gases are further deflected thereby, in an upstream or partially upstream direction.

Preferably the downstream portion of the cowl with its cascade members is moved downstream before pivoting of the downstream ends of the engine casing, so as to prevent impingement of engine exhaust gas onto the inner wall of the cowl.

The invention will now be described with reference to the accompanying drawings in which:

FIG. 1 is an axial, cross-section through a gas turbine jet propulsion ducted fan engine.

FIG. 2 is a cross-sectioned part view on line 2 — 2 of FIG. 1.

In FIG. 1 a gas turbine jet propulsion ducted fan engine is indicated generally by the numeral 10. The assembly comprises a gas turbine jet propulsion engine 12 the profile of which is shown in dotted lines, a casing 14 which encloses engine 12, a single stage of fan blades 16 mounted co-axially with the engine so as to be rotated by a turbine stage of the engine and a cowl 18 within which the engine is co-axially mounted, in spaced apart relationship therewith by struts 20 so as to form a duct 22 therebetween. Duct 22 terminates at its downstream end in a nozzle 24. Fan 16 when rotated by said fan stage, compresses air and pushes it through duct 22 and out of nozzle 24, thus providing a thrust reaction supplementary to the thrust produced by engine 12. Hence the expression "ducted fan gas turbine jet propulsion engine."

It is to be noted that the terms "upstream" and "downstream" as used in this Specification are used in relation to the direction of flow of hot gases and air through the engine.

The downstream end of casing 14 comprises two clam shell-like doors 26 and 28 mounted for pivoting about a common axis 30 tansverse to the engine axis. The doors are pivoted towards each other by means which are not shown in the drawings, but which may be powered rams or screwjacks, until their downstream edges abut each other as shown in dotted lines. Thus there is formed a hot gas thrust deflector known by those skilled in the art as a target type deflector. Hot gases emitted from the nozzle of engine 12 are deflected radially outwards by the doors.

The downstream end 32 of cowl 18 is separated from the remainder thereof, but is, at least in part, located within the remainder. The downstream part comprises a nozzle portion 32a, a framework or cascade of vanes 32b and a cylindrical portion 32c. Nozzle portion 32a abuts the main portion of cowl 18 when its services are required as a nozzle for duct 22 and cascades 32b and cylindrical portion 32c nest within cowl 18.

Cascade vanes 32b are provided for the purpose of further deflecting at least some of the engine exhaust gases and, in addition, deflecting air which has passed through duct 22, so as to give an upstream flow whereby to provide a degree of reverse thrust.

End 32 is slidably supported, by a plurality of ribs 34 of which only one is shown, the ribs being mounted in tracks 36 aligned on the engine casing 14. In FIG. 2 there is shown, by way of example, roller bearings 38 between the rib and track to reduce friction therebetween during translation of the rib.

Translation of downstream end 32 could be achieved by powered rams or screwjacks (not shown). The rams or screwjacks could be the same as those used to pivot doors 26 and 28 or they could be in addition thereto. Whichever system is used, it would be essential to ensure that downstream part 32 moved downstream, taking cascade members 32b and cylindrical portion 32c with it, before doors 26 and 28 pivot into their hot gas deflection position. If this is done, hot exhaust gases will not impinge on the inner wall of end 32a, but will first deflect the air in duct 22 radially outwards and then impinge, with the air, on cascade vanes of member 32b and be turned in a generally upstream direction. Cylindrical portion 32c, in its downstream position, provides continuity of the fan duct wall.

By using hot exhaust gas to deflect fan air, the need for metallic obstruction in the fan duct is obviated, resulting in thrust deflection apparatus which is smaller, lighter and has less moving parts than would apparatus which is designed to block both the nozzle of engine 12 and the fan duct nozzle 24.

It has been found that merely to deflect the hot gases from the engine nozzle across the fan duct, is not sufficient to deflect the fan air efficiently. The air tends to stick tightly to the outer surface of the engine casing 14. Thus, a step 40 is provided at the junction of the doors 26 and 28 with the upstream part of engine casing 14. When the doors are pivoted to their operative position the step 40, is exposed. Air flowing through duct 22 reaches step 40 and breaks away, thus becoming a free stream which is easier to deflect.

We claim:

1. A fan type jet propulsion power plant comprising: an annular engine casing member, a gas turbine propulsion engine enclosed in said casing member, said casing member having at least a pair of engine exhaust gas thrust reverser members movable from an inoperable position wherein they form part of the casing member to an operable position totally within a projected transverse section of said casing member wherein they obstruct exhaust gas from the engine and deflect the same radially outwardly and at least partially forward, at least one stage of fan blades mounted for rotation about a longitudinal axis of said engine at the forward end of said engine, a cowl member surrounding said engine casing and spaced radially outwardly therefrom to define a fan duct for air, said cowl member having a forward upstream portion surrounding said stage of fan blades and a downstream portion movable relative thereto from a first position where it forms part of said fan duct to a second position downstream thereof, said downstream portion of said cowl member including in flow series a cylindrical wall portion, a cascade of vane members, and a nozzle portion, said cylindrical wall portion and said cascade of vane members being received within the upstream portion when said downstream portion is in its first position and said cylindrical wall portion forming an extension of said fan duct and said cascade vane members forming an opening radially outwardly of the thrust reverser members for receiving deflected exhaust gases therethrough when said downstream portion is in said second position, the deflected exhaust gases forming a fluid block deflection for fan air in said fan duct, and at least one rib on said downstream portion of said cowl member, said rib having one end slidably mounted on said engine casing member for guiding said downstream portion when moved relative to said upstream portion.

2. A fan type jet propulsion power plant as claimed in claim 1 wherein said cascade vane members have an arcuate shape with a concave face directed toward the upstream end of said power plant for further directing exhaust gases and fan air deflected by exhaust gases in at least a partially upstream direction exteriorly of the cowl member.

* * * * *